United States Patent [19]

Filaferro et al.

[11] 3,891,927

[45] June 24, 1975

[54] PHASE CORRECTION DEVICE FOR DEMODULATION OF BIPOLAR SIGNALS

[75] Inventors: Rene Filaferro, Suresnes; Francois Hebert, Villebon sur Yvette, both of France

[73] Assignee: Compagnie Industrielle des Telecommunications Cit-Alcatel, France

[22] Filed: July 19, 1973

[21] Appl. No.: 380,557

[30] Foreign Application Priority Data

July 19, 1972 France ............................. 72.26068
Sept. 14, 1972 France ............................. 72.32621

[52] U.S. Cl. .............. 325/421; 178/69.5 R; 178/88; 325/38 A; 325/419; 325/476; 329/50

[51] Int. Cl. .......................... H03d 1/02; H04b 1/16

[58] Field of Search ......... 325/35 A, 42, 58, 65, 63, 325/323, 324, 395, 416–421, 472–476; 178/68, 69.5 R, 88; 328/151; 329/50, 168

[56] References Cited

UNITED STATES PATENTS

| | | | |
|---|---|---|---|
| 3,109,143 | 10/1963 | Gluth | 178/68 |
| 3,311,833 | 3/1967 | Lewis et al. | 325/474 |
| 3,435,343 | 3/1969 | Pierret | 325/476 |
| 3,462,687 | 8/1969 | Becker et al. | 325/38 A |
| 3,581,207 | 5/1971 | Chang | 325/42 |
| 3,590,386 | 6/1971 | Tisi et al. | 325/38 A |
| 3,758,861 | 9/1973 | Dejager et al. | 178/68 |
| 3,772,598 | 11/1973 | Van Gerwen | 178/68 |

*Primary Examiner*—Robert L. Griffin
*Assistant Examiner*—Marc E. Bookbinder
*Attorney, Agent, or Firm*—Craig & Antonelli

[57] ABSTRACT

Phase correction device for a 2880 c/s carrier which is used for transporting the received band to the basic band (0 – 2400 c/s), the correction being based on characteristics relating to the form of the signal in the basic band.

12 Claims, 4 Drawing Figures

PHASE CORRECTION DEVICE FOR DEMODULATION OF BIPOLAR SIGNALS

BACKGROUND OF THE INVENTION

Field of the Invention

The invention comes within the branch of data transmission by bipolar signals. It concerns a device for putting into the phase of a carrier at 2880 c/s, which is used for transposing the received signal (480 – 2880 c/s band) to the basic band (0 – 2400 c/s), a correction based on characteristics relating to the form of the signal in the basic band. The intended application is for receivers for data transmission.

In data transmission a bipolar signal having three levels (+1, 0, –1) is often preferred to a bivalent signal (0, 1), since a bivalent signal requires the transmission of a continuous component while a bipolar signal does not. The present invention will be described where the type of signal used is the two order bipolar interlaced signal. When two order bipolar interlaced signals are used, the bits 1 which are received at odd clock instants are alternately shown by $\epsilon 1, -\epsilon 1, \epsilon 1, -\epsilon 1$, etc. and the bits 1 which are received at the even clock instant are shown by $\epsilon' 1, -\epsilon' 1, \epsilon' 1, -\epsilon' 1$, etc., $\epsilon$ and $\epsilon'$ being indiscriminately + or – but remaining invariable during the transmission of a message.

It is known that in the case of an ideal bipolar signal, between a descending transition + → 0 and a descending transition 0 → – which follows it, there is a stage 0. Likewise, between an ascending transition – → 0 and an ascending transition 0 → + which follows it, there is a stage 0.

It is known that, to transpose the received signal situated in the 480 – 2880 c/s band into the basic 0–2400 c/s band, it is current practice to make use of a modulator fed on the one hand, with a received signal (480 – 2880 c/s band), and on the other hand, with a carrier fo = 2880 c/s.

If the phase of the carrier fo is correct, a stage 0 will effectively be observed at the required places; otherwise, either a + stage or a – stage will be obtained, according to the dephasing of the carrier.

To transform the received bipolar signal into the bivalent signal, a modem comprises a + peak limiter, which supplies + gating pulses separating a (0, +) transition from the following (+, 0) transition and a –0 peak limiter, which supplies – gating pulses separating a (0, –) transition from the following (–, 0) transition. On adding together the sum of the output currents of the two peak limiters, the reconstituted bivalent signal is obtained.

SUMARY OF THE INVENTION

The invention uses these circuitry elements, which exist currently in a modem, and consists in integrating the baseband bipolar signal during a time interval between the instant when it leaves the + peak-limiting level and the instant when it reaches the – peak-limiting level. On the other hand, if, after having left the + peak-limiting level, the signal again reaches the + peak-limiting level without having reached the – peak-limiting level, the portion of the signal concerned is not taken into consideration in the integration.

It is also possible to effect the integration during a time interval between the instant when the base-band bipolar signal leaves the – peak-limiting level and the instant when it reaches the + peak-limiting level and again use a correction channel of the first type and a correction channel of the second type concurrently to increase security.

The integrated signal obtained in such a manner is used in adjusting the phase of the carrier fo to the required value, providing, at the output of the modulator, a signal in the basic band corresponding to the characteristics set forth above.

According to a first method of application, the integrated signal is comprised in a synchronization loop containing an electronically controlled phase shifter which affects a carrier whose frequency is fo = 2880 c/s transmitted with the received signal (480 – 2880 c/s band) and extracted by filtering.

According to a second method of application, the integrated signal is comprised in a synchronization loop containing an electrically controlled oscillator. That second method brings about a simplification in relation to the first method, since it avoids the transmission in the line of the carrier whose frequency is fo, as well as the filtering necessary for extracting that carrier from the received spectrum.

BRIEF DESCRIPTION OF THE DRAWINGS

The invention will be described in detail with reference to the accompanying drawings, among which.

DESCRIPTION OF THE PREFERRED EMBODIMENTS

Figure 1:
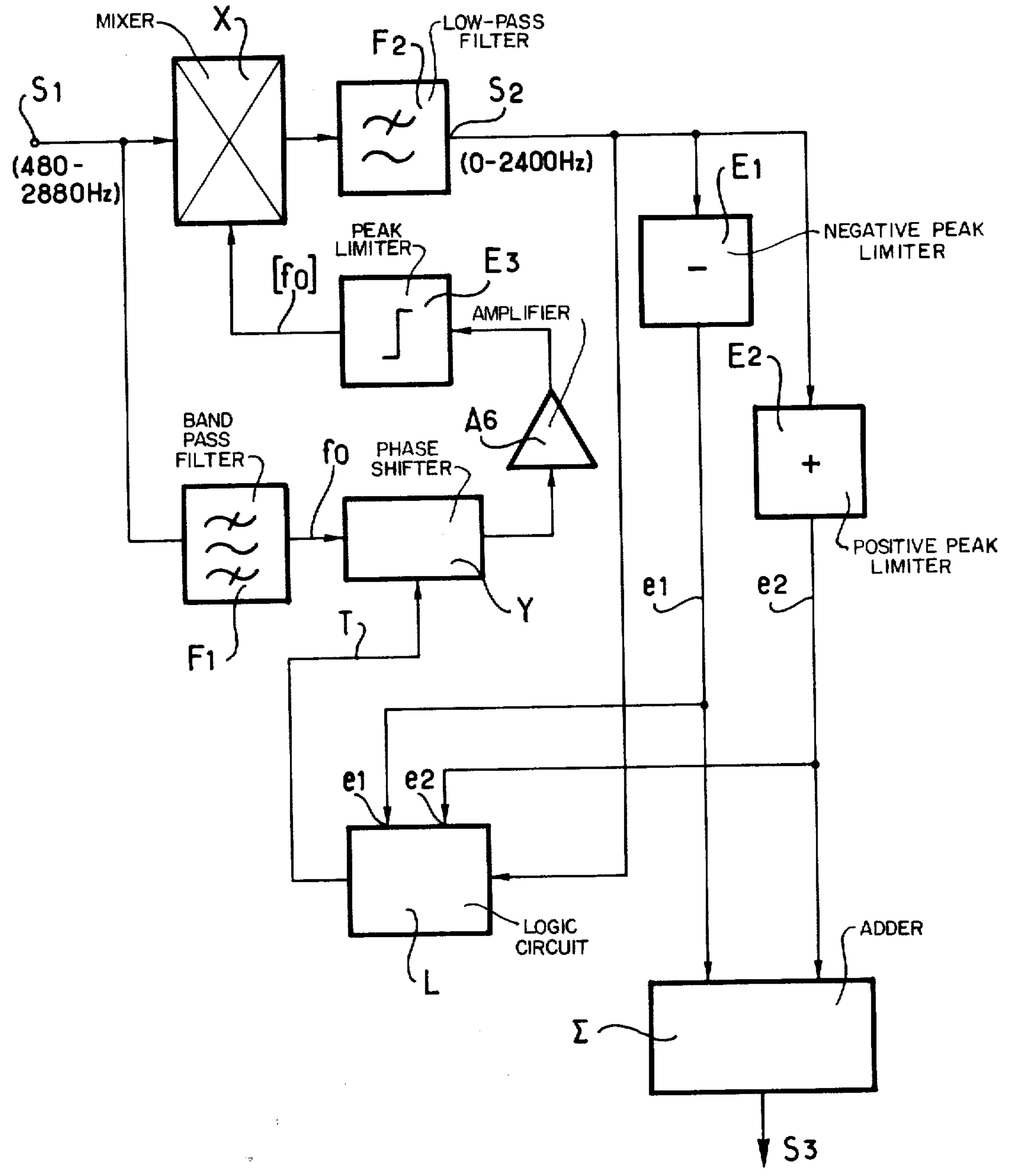
FIG. 1 is a block diagram of a device implementing the operating principle set forth above according to the first method.

As depicted in FIG. 1, the received signal S1 (480 – 2880 c/s) is applied to a modulator or mixer X, which receives, moreover, the carrier fo (2880 c/s), in phase, which has been extracted from the received signal by a band-pass filter F1 (2880 c/s), which provides the carrier fo which is not phase corrected; the latter is applied to a phase corrector or shifter Y and leaves the latter, in the corrected state, passing through an amplifier A6 and a peak-limiter E3.

At the output of the modulator X, the signal S2 (0 – 2400 c/s), in the basic band, which is applied to a – peak-limiter E1 and to a + peak-limiter E2, in parallel, is collected downstream from a low-pass filter F2. The signals *e*1 and *e*2, coming from the peak-limiters E1, E2 respectively, are applied to a summing element Σ which supplies, at the output, a corresponding bivalent signal S3.

At the same time, the signals *e*1, *e*2 are applied to a logic assembly L, which also receives the signal S2 in the basic band and supplies a continuous signal T, which is slowly variable and is applied to the input of the phase corrector Y.

Figure 2:
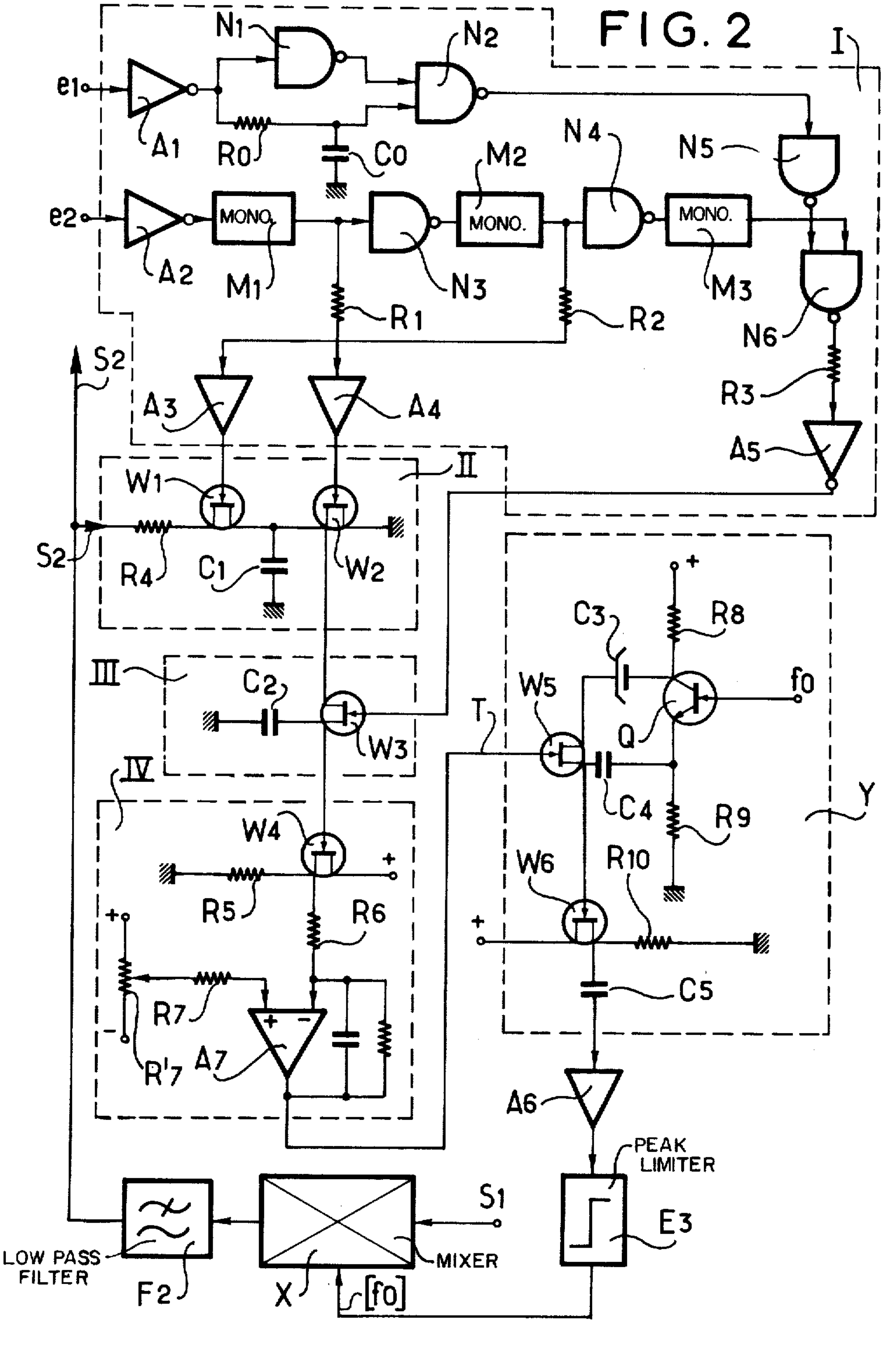
FIG. 2 is a more detailed diagram of a part of the block diagram in FIG. 1.

FIG. 2 is a diagram of an embodiment of the assembly L in FIG. 1.

Frame I is a sub-assembly for the pre-treating of signals *e*1, *e*2 whose peaks have been limited.

Frame II is a sampling sub-assembly, frame III is a pre-integration sub-assembly, and frame IV is an integration sub-assembly.

The logic unit L comprises the four sub-assemblies I, II, III, IV.

The signal *e*1 (see FIG. 1), amplified by an amplifier A1, passes through a circuit having two branches (inverter N1 and shunt circuit Ro, Co) in parallel, followed by a NAND gate N2; N2 provides a short pulse (in the order of 10$\mu$s, for example) in response to the energizing by e1.

The signal e2, amplified by an amplifier A2, is received by a first monostable multivibrator M1 (duration $\tau 1$), followed by a second monostable multivibrator M2 (duration $\tau 2$), itself followed by a third monostable multivibrator M3 (duration $\tau 3$).

Inverters N3, N4, N5 are inserted in series at the output of each of the three multivibrators M1, M2, M3.

The output of the gate N2 is applied to inverter N5, and the output of the inverter N5 and the output of monostable multivibrator M3 are connected to the inputs of a NAND gate N6.

The signal S2 (frame II) is received by a sampling element formed by a field effect transistor W1 whose "drain" terminal is connected to a charge capacitor C1. The "source" terminal is connected to the signal S2 through a resistor R4. The grid or gate terminal receives the output signal of M2 amplified by an amplifier A3, having an input resistor R2 in series.

The capacitor C1 may be short-circuited by a field effect transistor W2, whose source terminal is connected to the drain terminal of W1; the drain terminal is grounded and the grid terminal receives the output signal of M1 amplified by an amplifier A4, having an input resistor R1 in series.

The source terminal of W2 is connected also (frame III) to the source terminal of a field effect transistor W3, whose grid terminal receives the output signal of N6 amplified by an amplifier A5 having an input resistor R3 in series. The drain terminal of W3 is connected on the one hand to a capacitor C2 and on the other hand to the grid terminal of a field effect transistor W4 (frame IV) whose source terminal is connected to a + voltage supply and the drain terminal is connected on the one hand to ground by a resistor R5 and on the other hand to a − input of an integrating amplifier A7, through a resistor R6. The + terminal of the amplifier A7 is connected by a resistor R7 to the slide of a variable resistor R'7 connected up between a + source and a − source.

The output signal T of the integrating amplifier A7 is applied to the input of the phase shifter Y (FIG. 1).

The phase shifter Y receives, at the output of the filter F1 (FIG. 1), the frequency fo to be phase corrected on the base of a transistor Q whose collector is connected to the + source by a resistor R8 and whose emitter leads to ground through a resistor R9. The collector of Q is also connected to the source terminal of a field effect transistor W5 through a capacitor C3 having a high value (for example 100 $\mu$F). The emitter of Q is connected to the drain terminal of W5 by a capacitor C4 having a lower value, for example 0.1 $\mu$F. The drain terminal of W5 is connected to the grid terminal of a field effect transistor W6, whose drain terminal leads to the + source and whose source terminal leads to ground through a resistor R10. W5 acts as a variable resistor controlled by the signal T applied to its grid terminal.

The source terminal of W6 is connected by a capacitor C5 to the input of the amplifier A6 (see FIG. 1).

Downstream from the peak-limiter E3, the phase-corrected carrier [fo] is received by the modulator X, which receives, moreover, the signal S1 (see FIG. 1). The signal S2 in the basic band has its output downstream from the filter F2.

Moreover, the signal S2 is applied to the peak-limiters E1 and E2 and the signals whose peaks have been limited are applied to the circuit $\Sigma$ (see FIG. 1).

Figure 3:
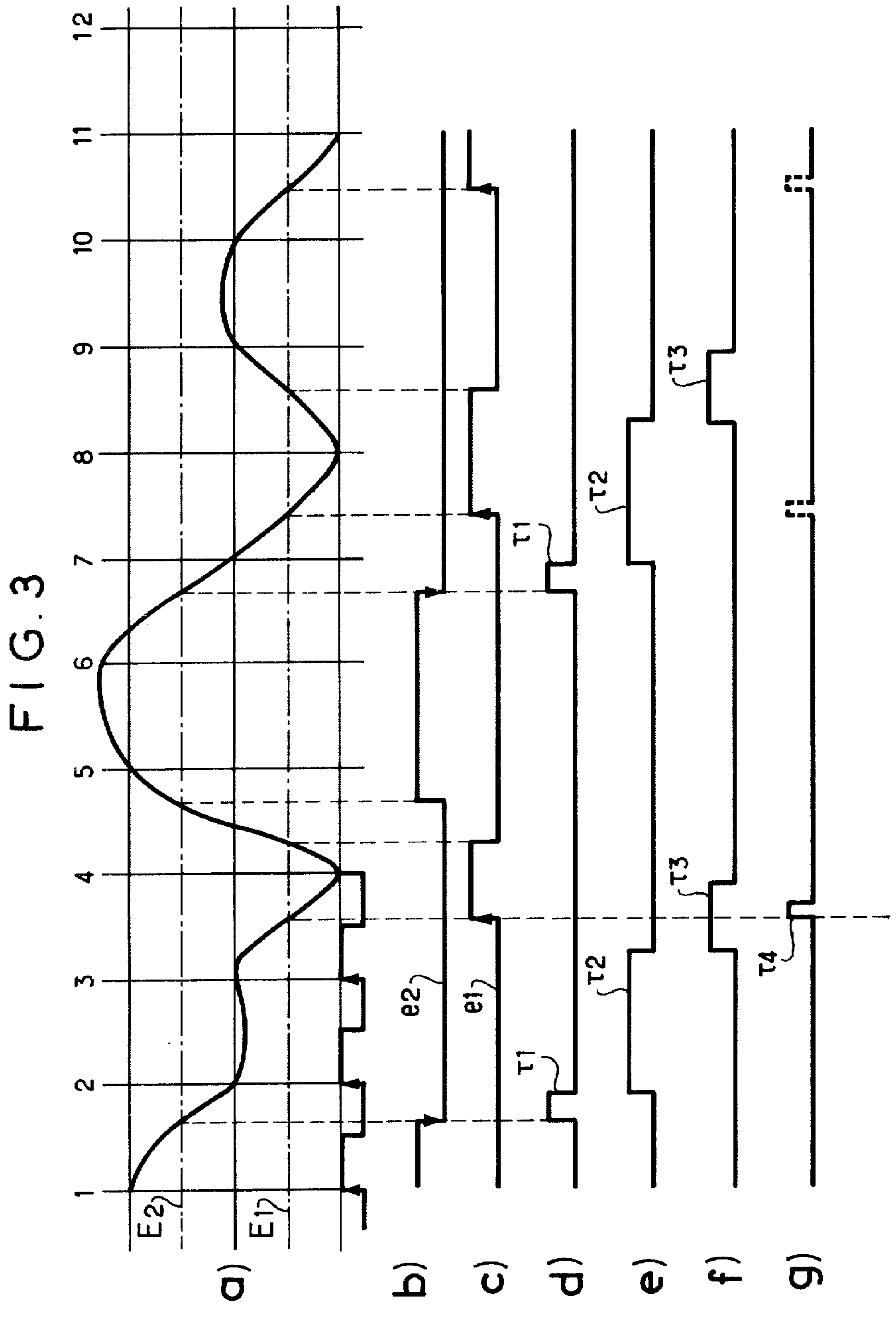
FIG. 3 contains forms of signals as a function of time, which set forth the basic principle of the invention.

FIG. 3 contains seven graphs, (a) . . . (g).

Graph (a) shows the form of an assumed bipolar signal, taken, as an example, over a duration of ten clock instants. The clock is marked at the bottom of graph (a).

The rising wave-front of the clock signal marks the separation of the instants. For a telegraphic speed of 4800 bauds, the telegraphic instant lasts about 208$\mu$s. The − peak-limiting level (E1) and the + peak-limiting level (E2) have been marked in graph (*a*).

Graph (b) shows the signal *e*2: it shows the appearance of a descending wave-front when the signal leaves the + peak-limiting level and the appearance of a rising wave-front when the signal reaches the + peak-limiting level.

Graph (c) shows the signal *e*1: it shows the appearance of a rising wave-front when the signal reaches the − peak-limiting level and the appearance of a descending wave-front when the signal leaves the − peak-limiting level.

Graph (d) shows the signal (gating pulse lasting $\tau 1$) sent out by the monostable multivibrator M1 to the grid terminal of W2.

Graph (e) shows the signal (gating pulse lasting $\tau 2$) sent out by the monostable multivibrator M2 to the grid terminal of W1.

Graph (f) shows the signal (gating pulse lasting $\tau 3$) sent out by N5 the monostable multivibrator M3 to an input of the gate N6.

Graph (g) shows that a short pulse lasting $\tau 4$ (in the order of 20 $\mu$s) is triggered by the rising wave-front of the signal e1 (graph (*c*)). The pulse shown by a continuous line $\tau 4$, which appears during a gating pulse, is an effective transfer order. The pulses shown by broken lines, which appear when there is no gating pulse $\tau 3$, are ineffective transfer signals.

The sampling process begins when the signal leaves the + peak-limiting level; the descending wave-front of (b) triggers a pulse $\tau 1$ (d) which short-circuits the charge capacitor C1 by W2 and therefore empties it of its charge.

The field effect transistor W1 is made conductive during $\tau 2$: the capacitor C1 is charged under the effect of the signal.

If a transfer order (graph *g*) arrives during a transfer window $\tau 3$ (graph *f*), W3 is made conductive by the output of N6, the charge of C1 is transferred to C2, which through the field effect transistor W4 having a high input impedance, applies it to the − input of the integrator amplifier A7.

On the other hand, a transfer signal (g, shown in broken lines) coming when there is no transfer window $\tau 3$, is not transmitted by N6.

The durations $\tau 1$, $\tau 2$, $\tau 3$ are not critical. It will be assumed, for example, that $\tau 1 = 50$ $\mu$s, that $\tau 2$ is in the order of 1.5 times the duration of a telegraphic instant m, that $\tau 3$ is in the order of 0.75 times the duration of the telegraphic instant. For a speed of 4800 bauds, $m = 208\ \mu s$, which means that $\tau 2 = 270\ \mu s$, $\tau 3 = 130\ \mu s$ for example, whereas $\tau 4 = 20\ \mu s$ approximately.

Figure 4:
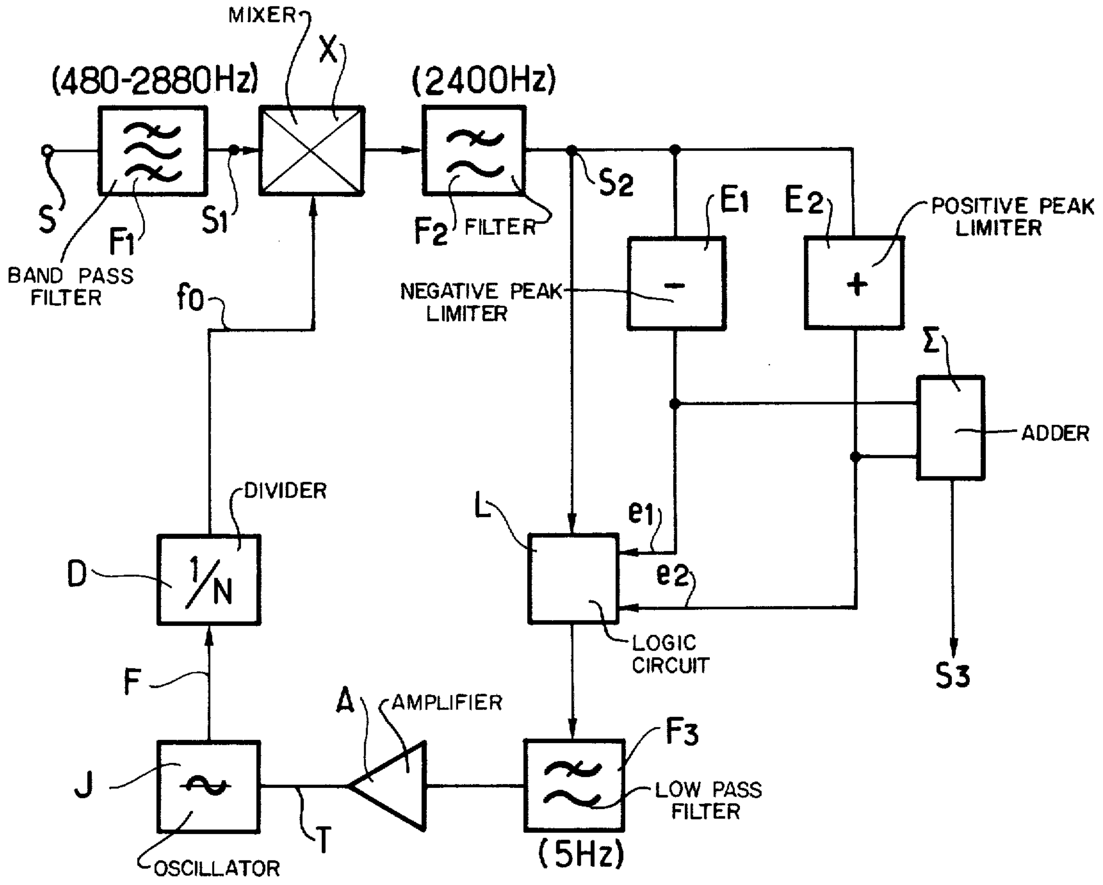
FIG. 4 is a block diagram of a device according to the second method.

FIG. 4 depicts an embodiment of the invention wherein on an input terminal, a transmission line (which has not been shown) supplies a bipolar signal S which, downstream from a band-pass filter F1 (480 – 2880 c/s) supplies a signal S1 applied to an input of a modulator X having two inputs. Downstream from a band-pass filter F2, having a cut-out frequency of 2400 c/s, a bipolar signal S2 is obtained, in the basic band, which is applied to two peak-limiters E1(−) and E2(+), which supply two output signals $e1$, $e2$, respectively. The signals $e1$, $e2$, added in an adder Σ, supply, at the output, a bivalent signal S3.

Moreover, the signal S2, on the one hand and the signals $e1$, $e2$, on the other hand, are applied to a logic unit L identical to the logic unit L described with reference to FIG. 2.

The output signal of the logic unit L passes through a low-pass filter F3, or delay cell, having a cut-out frequency in the order of 5 c/s, then is amplified by an amplifier A, whose output signal T is applied to control an electronically controlled oscillator J. For reasons of technological convenience, the oscillator J does not oscillate at the frequency fo = 2880 c/s, but at multiple frequency F at a ratio N. In the present case it has been assumed that N = 32. Therefore, in the present case, the result obtained is F = 92160 c/s.

Downstream from a divider D whose ratio is N (for example N = 32) connected to the oscillator J, the frequency [fo] which is applied to the second input of the modulator X is collected.

On a circuit produced, the following values of the parameters were observed:

Range of capture of the control loop (at the level of the carrier fo) = $\Delta f = \pm 7$ c/s. As in all subjection frequency circuits, the circuitry in the invention is equipped with a frequency scanning system, not shown, which brings the frequency of the oscillator J within the range of subjection.

Maximum locking time: 300 ms

Maximum phase deviation: $\Delta\mu = 5°$

Scintillation ("jig" effect) of the carrier: 2% of the period.

The signal T varies according to the difference in phase between the carrier which has been used for the transposition at the emission and the reconstituted carrier at the receiver. It may assume two values corresponding to two adjustments 180° apart. This is of no importance, the peak-limiting of the signals sent out by the demodulator removing all significance from their polarity, since a + signal and a − signal are both transformed into a logic 1 after peak-limiting ($e1$, $e2$).

What is claimed is:

1. Apparatus for obtaining synchronous demodulation of a wave amplitude modulated by a rhythmic bipolar signal, by applying phase correction to a carrier frequency wave, said apparatus comprising:

means for supplying said carrier frequency wave;

demodulating means responsive to said modulated wave and to said carrier frequency wave for supplying a base-band bipolar signal;

first means responsive to the amplitude of said base-band bipolar signal for generating a first signal representative of the length of time between the instant that the amplitude of said base-band bipolar signal departs from a first peak-limiting level having a first polarity until said amplitude returns thereto;

second means responsive to the amplitude of said base-band bipolar signal for generating a second signal representative of the length of time between the instant that the amplitude of said base-band bipolar signal departs from a second peak-limiting level having a second polarity until said amplitude returns thereto; and a logic circuit comprising input circuit means for receiving said base-band bipolar signal, integrating means responsive to said input circuit means for integrating a signal applied thereto, and control means responsive to said first signal and to said second signal for controlling said input circuit means so as to allow the integration of said base-band bipolar signal during a time interval between a first intant when the amplitude of said base-band bipolar signal departs from said first peak-limiting level and a second instant when said amplitude arrives at said second peak-limiting level, and to exclude the integration of that portion of said base-band bipolar signal which departs from one of said peak-limiting levels and rearrives thereat without having reached the other peak-limiting level, the output signal of said integrating means being applied to said carrier frequency wave supplying means for controlling the phase of said carrier frequency wave.

2. Apparatus according to claim 1, wherein said input circuit means comprises a charge capacitor which charges in response to said base-band bipolar signal being applied thereto, said integrating means comprising an integrating amplifier circuit coupled to said charge capacitor;

said input circuit means further comprises a first switching circuit for effectively discharging said capacitor a first preselected period of time after the generation of said second signal, and a second switching circuit for effectively charging said capacitor a second preselected period of time after the generation of said second signal, subsequent to said first preselected period of time; and said logic circuit further comprises a third switching circuit, responsive to said first signal and said second signal, for coupling the charge on said capacitor to said integrating amplifier circuit, in response to said second signal being generated during a preselected interval subsequent to said second preselected period of time.

3. Apparatus according to claim 2, wherein said third switching circuit includes a first gate circuit for generating a charge transfer signal having a prescribed time duration in response to said first and second signals, said charge transfer signal controlling the transfer of the charge on said charge capacitor to a transfer capacitor connected to an input of said integrating amplifier circuit.

4. Apparatus according to claim 3, wherein said second preselected period of time and said preselected interval have respective durations of approximately 1.5 and 0.75 times the duration of the rhythm period of said rhythmic bipolar signal, with said first preselected period of time and said prescribed time duration being subtantially shorter.

5. Apparatus according to claim 2, wherein each of said switching circuits comprises a field effect transistor circuit.

6. Apparatus according to claim 3, further including a first NAND gate and an integrating circuit coupled to receive said first signal and the outputs of which are connected to a second NAND gate, the output of which constitutes a first input to said first gate circuit.

7. Apparatus according to claim 6, further including a first monostable multivibrator coupled to receive said second signal for generating an enabling signal for said first switching circuit, a second monostable multivibrator, coupled to the output of said first monostable multivibrator, for generating an enabling signal for said second switching circuit, and a third monostable multivibrator, coupled between the output of said second monostable multivibrator and a second input of said first gate circuit, for supplying thereto a pulse signal having a pulse width corresponding to said preselected interval.

8. Apparatus according to claim 2, wherein said apparatus defines a synchronization loop, wherein said carrier frequency wave supplying means includes an electronically controlled phase shift circuit including a first input terminal for receiving the carrier signal of said modulated wave and a second input terminal for receiving the output of said integrating amplifier circuit for applying a phase correction to said carrier signal in accordance with the output of said integrating amplifier circuit, and means for coupling said phase corrected carrier to said demodulating means.

9. Apparatus according to claim 2, wherein said apparatus defines a synchronization loop wherein said carrier frequency wave supplying means includes an electronically controlled oscillator circuit, responsive to the output of said integrating amplifier circuit, for generating a controlled synchronous oscillator signal, and means for applying said controlled synchronous oscillator signal to said demodulating means, in response to the output of said oscillator, and demodulating said modulated wave in accordance therewith.

10. Apparatus according to claim 9, wherein said modulated wave is applied as one input to said demodulating means and to the other input of which the output of said oscillator circuit is applied through an integral divider circuit.

11. Apparatus according to claim 10, wherein the output of said demodulating means is coupled to said first and second means and to one input of said logic circuit.

12. Apparatus according to claim 8, wherein said modulated wave is applied as one input to said demodulating means and to the other input of which said phase corrected carrier wave is applied through a peak-limiting circuit, the output of said demodulating means being applied through a filter circuit to said second switching circuit of said logic circuit.

* * * * *